US006030728A

United States Patent [19]
Cotte et al.

[11] Patent Number: 6,030,728
[45] Date of Patent: Feb. 29, 2000

[54] HIGH PERFORMANCE LITHIUM POLYMER ELECTROLYTE BATTERY

[75] Inventors: John M. Cotte, New Fairfield, Conn.; Madhav Datta, Yorktown Heights, N.Y.

[73] Assignee: International Business Machines Corporation, Armonk, N.Y.

[21] Appl. No.: 08/915,134

[22] Filed: Aug. 20, 1997

[51] Int. Cl.$^7$ ................................................ H01M 6/18
[52] U.S. Cl. ........................................ 429/329; 429/331
[58] Field of Search ................ 429/231.95, 303, 429/314, 331, 326, 329, 127, 162, 337

[56] References Cited

U.S. PATENT DOCUMENTS

| | | | |
|---|---|---|---|
| 5,219,679 | 6/1993 | Abraham et al. | 429/192 |
| 5,240,790 | 8/1993 | Chua et al. | 429/190 |
| 5,552,239 | 9/1996 | Gozdz et al. | 429/94 |
| 5,558,957 | 9/1996 | Datta et al. | 429/127 |
| 5,641,590 | 6/1997 | Sato et al. | 429/192 |

*Primary Examiner*—Maria Nuzzolillo
*Assistant Examiner*—J. O'Malley
*Attorney, Agent, or Firm*—Casey P. August; Gary M. Hartman; Domenica N. S. Hartman

[57] ABSTRACT

A primary lithium battery particularly adapted for use in self-contained self-powered devices (SSPD) for mobile communication and computing products, such as radio frequency identification tags, PCMCIA cards, and smart cards. The battery utilizes a solid polymer electrolyte membrane that preferably has a polyacrylonitrile matrix. Performance of the electrolyte membrane is optimized by controlling the amount of aprotic organic solvents within the membrane within a prescribed range of ratios. The battery cathode is encapsulated within a polymeric matrix that eliminates the exposure hazard posed by lithium intercalation compounds used within the cathode. Use of stainless steel foil current collectors gives a high open circuit voltage of 3.8 volts and high cell capacity. A method of determining the optimum cathode thickness in the battery is also described. This provides a means of maximizing volumetric and gravimetric energy densities by using the optimum amount of cathode material. Batteries fabricated by using optimal materials can be operated under pulsed and dc discharge conditions over a temperature range between about −40 and +80° C.

23 Claims, 5 Drawing Sheets

HIGH PERFORMANCE LITHIUM POLYMER ELECTROLYTE BATTERY

BACKGROUND OF INVENTION

1. CROSS-REFERENCE

The invention disclosed and claimed herein is related to the inventions disclosed and claimed in applications Ser. Nos. 08/727,096 (now abandoned) and 08/879,436, now U.S. Pat. No. 5,939,223 and 08/876,786 which were filed on Oct. 8, 1996, Jun. 20, 1997 and Jun. 17, 1997, respectively, and which are assigned to the same assignee as the instant invention.

2. FIELD OF THE INVENTION

Generally, this invention relates to lithium batteries for use in self-contained self-powered devices (SSPD) such as radio frequency identification tags, PCMCIA cards, and smart cards. More particularly, this invention relates to improved flexible lithium batteries adapted for use in self-contained self-powered devices and characterized by having optimized current collector materials and cathode thickness for enhanced power generating capabilities at sub-ambient temperatures compared to prior art solid electrolyte batteries.

3. BACKGROUND

Self-contained self-powered portable devices (SSPD) encompass an increasingly large market of mobile communication and computing products such as radio frequency identification (RF-ID) tags, PCMCIA cards, and smart cards. For a battery to be useable in such applications, it must deliver high energy density and specific energy with low rates of self-discharge. Primary (non-rechargeable) lithium batteries have been found particularly well suited for meeting these requirements. Since SSPDs are widely employed within products offered in the consumer microelectronics market, safety is an important design criterion. Accordingly, batteries used in such devices are generally constructed of all solid components, including the electrolyte, in order to avoid the hazard of electrolyte leakage. Such electrolytes have been formed as a solid polymer electrolyte composed of a polymer membrane having a suitable electrolyte contained within its matrix.

The use of polyethylene oxide (PEO) as a solid polymer electrolyte membrane material for a flexible lithium battery has been proposed in the prior art. Solid electrolytes formed with this material have exhibited satisfactory ambient temperature conductivity, and provide good performance at sub-ambient temperatures when used to deliver short current pulses of about thirty $\mu A/cm^2$ per for durations of up to about 10 milliseconds. Also, polyethylene oxide-based lithium batteries can be readily manufactured using well-established fabrication techniques, yielding a flexible battery that is both reliable and cost-efficient.

While polyethylene oxide-based electrolyte membranes have achieved many design criteria for SSPD applications, further improvements would be desirable, such as higher conductivity at sub-ambient temperatures Polyethylene-oxide-based electrolyte membranes generally exhibit insufficient conductivity to attain current pulses on the order of about 100 $\mu A/cm^2$ for about 100 milliseconds or more at sub-ambient temperatures, i.e., on the order of about 0° C. and less. Consequently, primary lithium batteries with polyethylene oxide-based electrolyte membranes are not ideally suited for SSPDs that specifically require extensive low temperature operations. If the sensitivity of a SSPD battery to temperature change could be reduced, the battery would be significantly more useful in a wider array of consumer microelectronics products, and enable SSPDs to operate reliably under the sub-ambient temperature conditions to which such products are occasionally exposed.

Accordingly, what is needed is a battery ideally suited for use in SSPD applications, necessitating that such a battery meet several demanding requirements: (i) the battery must be constructed of all solid components while still being flexible and compact; (ii) the battery should exhibit similar conductivity characteristics to primary batteries with liquid electrolytes and be able to maintain a necessary minimum level of conductivity at sub-ambient temperatures; (iii) the battery should be readily manufacturable in a manner that yields a battery that is both reliable and cost-efficient; (iv) the battery must provide maximum open circuit voltage, high discharge current and be corrosion resistant; and (v) the battery should have optimized thickness of components to provide maximized energy density.

SUMMARY OF THE INVENTION

This invention is generally a lithium battery optimized for use in consumer microelectronics products, and particularly self-contained self-powered devices (SSPD) such as radio frequency identification tags, PCMCIA cards, and smart cards. The battery is generally composed of all solid components, including a lithium foil anode, polymer electrolyte membrane and a foil cathode sandwiched between a pair of flexible current collectors, yielding a battery that is sufficiently flexible and compact to permit its use in various SSPD applications. In addition, the battery of this invention is characterized by having optimized current collector material and cathode thickness for enhanced power generating capabilities at sub-ambient temperatures compared to prior art solid electrolyte batteries, and is therefore well suited for more demanding SSPD applications.

To achieve the above, the battery of this invention includes a flexible polymer electrolyte membrane composed of an electrolyte within a polymeric binder. The electrolyte includes a lithium salt and an organic aprotic solvent composed of ethylene carbonate, propylene carbonate and gamma-butyrolactone in a predetermined ratio. Flexible primary batteries constructed in accordance with the above are capable of exhibiting a cell voltage of at least about 2.5 volts when discharged with a current pulse of about 100 microamperes, a pulse on-time of about 150 milliseconds and a pulse period of about one second while at a temperature of about 0° C. to about −40° C.

A preferred aspect is that a flexible primary battery constructed in accordance with this invention utilizes a flexible foil cathode within an encapsulating matrix, such that hazards associated with handling the cathode and exposure to its active ingredients are mimized. Preferably, the encapsulating matrix is composed of a modified version of the same polymeric binder used to form the polymer electrolyte membrane.

In view of the above, it can be seen that a flexible primary battery produced in accordance with the above is particularly well suited for use in SSPD applications and the like. The battery can be fabricated to have a flexible, compact and rugged construction, while also enabling a wide range of uses in SSPD and similar applications due to its enhanced performance at sub-ambient temperatures. Furthermore, batteries according to this invention are able to function satisfactorily at lower temperatures and provide high energy density than was heretofore possible.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
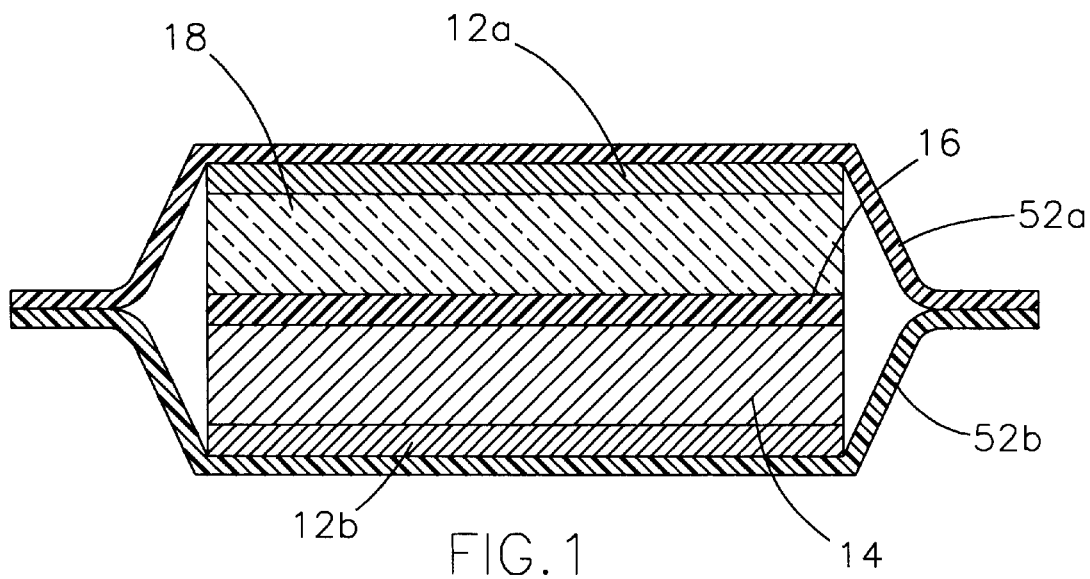
FIG. 1 shows in cross-section the construction of a flexible primary battery in accordance with a preferred embodiment of this invention.
Figure 2:
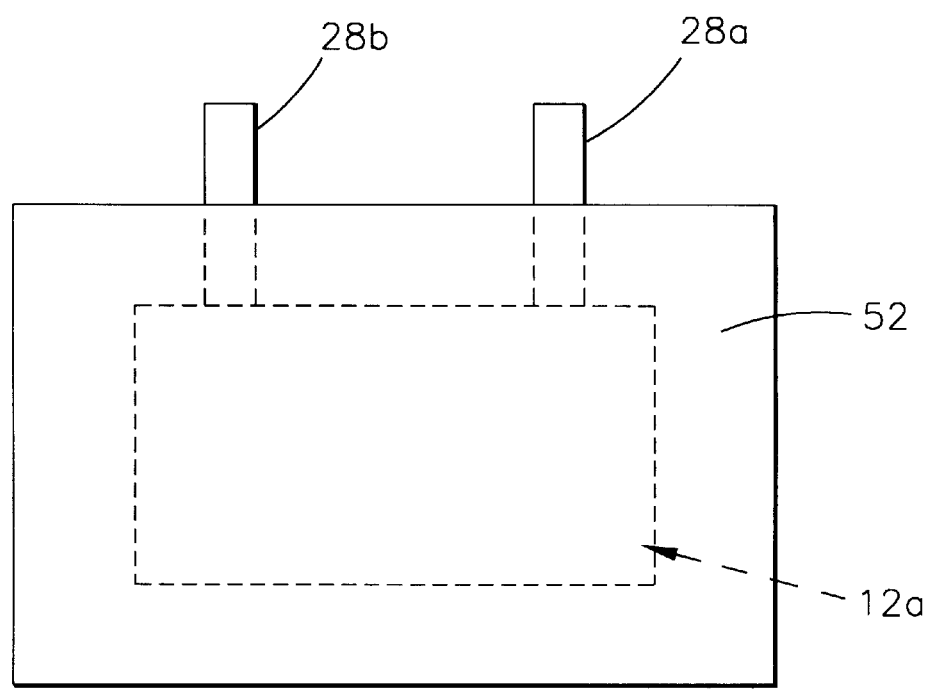
FIG. 2 is a top view of the battery of FIG. 1.

The present invention provides a primary lithium battery for use in SSPD and other applications, in which the battery is constructed of all solid components, including a solid polymer-based electrolyte membrane, yet is characterized by power generating and conductivity properties comparable to conventional primary batteries having liquid electrolytes. A suitable battery construction is represented in cross-section in FIG. 1. Battery 10 generally includes a pair of current collectors 12a and 12b, a lithium foil anode 14, a solid polymeric electrolyte membrane 16, and a flexible cathode 18. Battery 10 is encased by packaging material sheets 52a and 52b. In order to function, contact must be made with current collectors 12a and 12b which necessitates that they extend beyond or through sheets 52a and 52b as do tabs 28a and 28b in FIG. 2. Indeed, the arrangement shown in FIG. 2 is but one means for configuring battery 10. Sheets 52a and 52b thus must be heat sealable to each other and to metallic current collectors 12a and 12b. As disclosed in application Ser. No. 08/876,786, a material which was found suitable for this purpose was DZ260 which is available from the American National Can Company and which consists of a sheet of polyethylene sealed to a sheet of Saran and coated on one side with EAA (ethylacetic acid). Battery 10 has a planar shape, but can be configured to have essentially any suitable size and peripheral shape which will depend on the particular application for the SSPD application and the cell capacity required.

Figure 3:
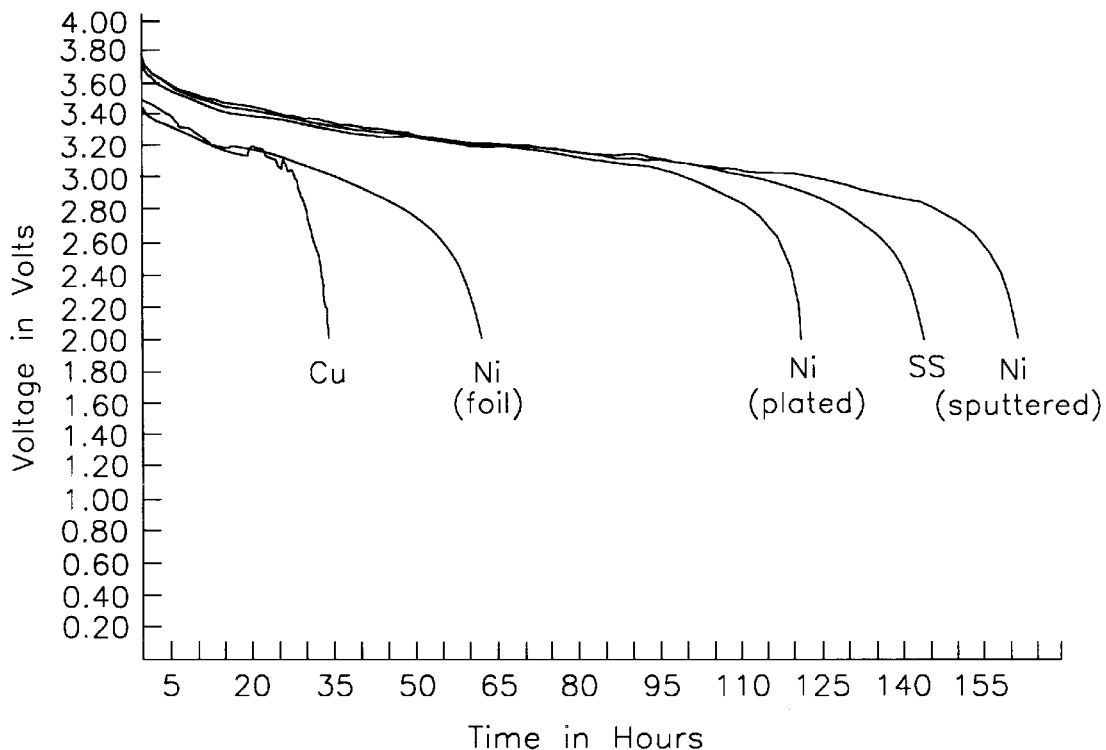
FIG. 3 shows the influence of current collector material on dc discharge at a discharge current density of 25 $\mu A/cm^2$ at room temperature.

Current collectors 12a and 12b are preferably composed of metallic foils. FIG. 3 shows dc discharge curves at a discharge current of 25 $\mu A/cm^2$ for cells with different current collector materials. FIG. 3 shows the influence of current collector material on the cell open circuit voltage (OCV) and the cell capacity, the later values determined from the dc discharge data at a cut off voltage of 2.0 volts.

The data in FIG. 3 demonstrates the importance of the current collector material in obtaining high cell voltage and high cell capacity. This data is summarized in Table I below.

TABLE I

| Current Collector Material | Capacity mAh/cm2 (at 25 uA/ cm2; ambient) | OCV (volts) |
| --- | --- | --- |
| Cu | 0.785 | 3.4 |
| Ni(foil) | 1.67 | 3.6 |
| Ni(Ni plated on Ni) | 2.97 | 3.8 |
| Ni(sputtered) | 3.86 | 3.8 |
| 302 Stainless Steel | 3.75 | 3.8 |

Based on the experimental data of FIG. 3 and Table I, 302 stainless steel and sputtered nickel are found to give high open circuit voltage of 3.8 volts and a high cell capacity of about 3.8 mah/cm$^2$.

As previously noted, sheets (or encapsulating layers) 52a and 52b must be heat sealable to each other and to metallic current collectors 12a and 12b and to tabs 28a and 28b. It was found that the sealing effectiveness depended on the nature of the current collector material and 302 stainless steel was found to seal better to the DZ260 material than sputtered or plated Ni foils, particularly at extreme temperatures of battery operation (i.e., +80° C. and −40° C. Thus 302 stainless steel foil was determined to be the best current collector material overall for the DZ260 packaging material used.

Lithium foil anode 14 has a thickness of about thirty to about one hundred micrometers, and preferably about thirty micrometers, but it is otherwise conventional in terms of lithium anodes used in primary lithium batteries. The dimensions given herein are exemplary, but may be used to scale the batteries to different sizes depending upon the application and cell capacity desired. In contrast, as disclosed in applications Ser. Nos. 08/727,096, now abandoned and 08/879,436, now U.S. Pat. No. 5,939,223 cathode 18 has a novel construction that employs a polymer matrix. Cathode 18 is generally composed of a lithium intercalation compound, such as highly reactive manganese dioxide (MnO$_2$). In addition, the thickness of cathode 18 is about 200 micrometers, with a suitable range being about 100 to about 300 micrometers. Contrary to prior practices, the lithium intercalation compound is provided in a powder form and dispersed within a polymeric matrix, whose particular formulation will be discussed in greater detail below, so as to avoid hazards associated with exposure to the intercalation compound. Because the lithium intercalation compound is encapsulated within a protective polymeric matrix, battery 10 can be manufactured with significantly reduced risks and difficulty associated with handling of a lithium intercalation compounds in powder form. Secondly, polymer-encapsulated cathode 18 of this invention resolves the safety problems that can arise if the battery 10 were accidentally or intentionally opened to expose the cathode 18.

As disclosed in applications Ser. Nos. 08/727,096 and 08/879,436 solid electrolyte membrane 16 is also specifically formulated to enhance the performance of battery 10, particularly at sub-ambient temperatures, i.e., temperatures on the order of about 0° C. and less. In a preferred embodiment, the electrolyte membrane 16 employs polyacrylonitrile (PAN) as a polymer binder in whose matrix is dispersed a liquid electrolyte composed of a lithium salt solution and aprotic organic solvents. The polyacrylonitrile-based electrolytic membrane 16 of this invention exhibits significantly better conductivity than prior art PEO-based polymer electrolyte membranes, with an ambient temperature conductivity of at least about $10^{-3} \Omega^{-1}$ cm$^{-1}$, which is comparable to liquid electrolytes. Membrane 16 captures the liquid electrolyte solution within its polyacrylonitrile matrix such that lithium ions provided by the electrolyte move through the membrane 16 in a manner similar to liquid electrolytes, in contrast to the "hopping" mechanism exhibited by PEO-type electrolyte membranes of the prior art. A suitable thickness for the polymer electrolyte membrane is about twenty-five to about one hundred micrometers.

As disclosed in applications Ser. Nos. 08/727,096 and 08/879,436 the lithium salt is preferably lithium triflate (LiCF$_3$ SO$_3$), though other suitable compounds could be substituted for or used in addition to lithium triflate, such as LiAsF$_6$, UIPF$_6$, LiClO$_4$ and Li(CF$_3$SO$_2$)$_2$N. The aprotic organic solvents are ethylene carbonate, propylene carbonate, and gamma-butyrolactone. The ratio of ethylene carbonate to propylene carbonate to gamma-butyrolactone is critical to the temperature sensitivity of the electrolyte membrane 16, and therefore must be maintained within an acceptable range. The effect that this ratio has on the power generating and electrical properties of electrolytic membrane 16 are discussed below with reference to tests performed on composition of this invention for the membrane 16, whose formulation is noted in Table II.

TABLE II

|  | wt. % | mol. % |
| --- | --- | --- |
| Polyacrylonitrile | 12.8 | 21 |
| Lithium Triflate | 9.0 | 5 |
| Ethylene Carbonate | 30.3 | 30 |
| Propylene Carbonate | 28.1 | 24 |
| γ-Butyrolactone | 19.8 | 20 |

Electrolyte membranes 16 having the above formulation were prepared by first mixig appropriate amounts of ethylene carbonate, γ-butyrolactone, and lithium salt in propylene carbonate, and then adding polyacrylonitrile powder. The solution was stirred to form a smooth opaque solution, and then heated to about 120° C. to about 150° C. to form a transparent, viscous homogeneous solution. The solution was then poured and pressed between two rigid surfaces with appropriate spacing to achieve a desired thickness for the membranes 16. Suitable materials for the rigid surfaces include glass, metal, and metal coated with TEFLON. The assembly was then cooled, yielding freestanding polymer electrolyte membranes 16 upon separation from the rigid surfaces. A suitable alternative to the above steps would be a continuous process by which the solution is heated and extruded between rigid plates that are passed through a pair of rollers.

As set forth in applications Ser. Nos. 08/727,096 and 08/879,436 exposure hazards posed by the materials used in the battery 10 of this invention are further reduced by the preferred construction of cathode 18. Specifically, cathode 18 preferably employs a polymer matrix in which its lithium intercalation compound is dispersed and encapsulated. Furthermore, the material for the polyacrylonitrile-based electrolyte membrane has been found to be highly suitable for this purpose. Accordingly, the manufacture of battery 10 includes the blending of a suitable lithium intercalation compound, such as manganese dioxide, into a polymer solution formulated in accordance with the formulations described in Table III.

A suitable method for forming cathode 18 entails introducing a manganese dioxide powder and carbon, in such forms as activated carbon or carbon black, into a solution of polyacrylonitrile-based electrolyte membrane material, which may be prepared in a manner as described above but having the optimized composition shown in Table III.

TABLE III

|  | wt. % | mol. % |
| --- | --- | --- |
| Polyacrylonitrile | 12.5 | 21 |
| Lithium Triflate | 8.8 | 5 |
| Ethylene Carbonate | 16.8 | 17 |
| Propylene Carbonate | 42.5 | 37 |
| γ-Butyrolactone | 19.4 | 20 |

Suitable weight percentages for the individual constituents of the cathode 18 are about fifty to about seventy weight percent manganese dioxide powder, about twenty-five to about fifty weight percent membrane solution, and up to about five weight percent carbon.

Figure 4:
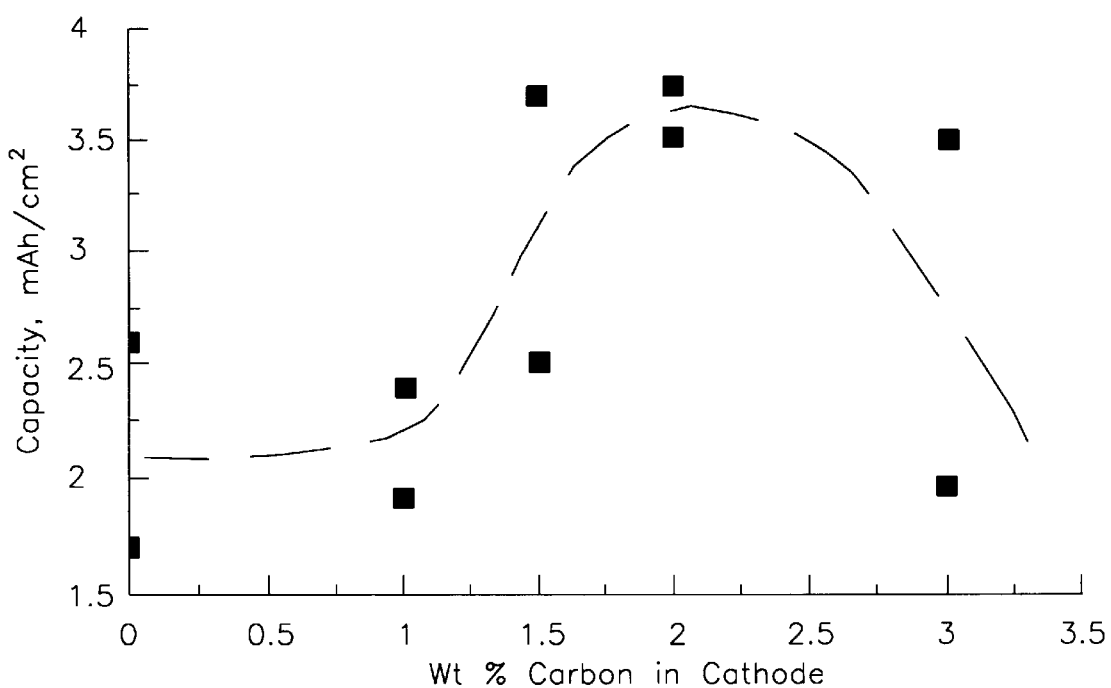
FIG. 4 shows cell capacity as a function of percentage of carbon in the cathode material.

FIG. 4 shows the influence of weight percent carbon in the cathode material on the cell capacity. The capacity data were determined from dc discharge curves for cells with stainless steel current collectors at a discharge current density of 25 $\mu$A/cm$^2$ at room temperatures, similar to the curves shown in FIG. 3. As shown in FIG. 4, the carbon is preferably about 2 weight percent. Preferred weight percent ratios for the manganese dioxide powder, membrane solution and carbon are about 50:45:5 to about 75:25:0. More preferably the ratios are between about 58:40:2 to about 59:40:1; optimally about 58:40:2. The result is a thick paste from which cathode 18 can be formed in a manner similar to the fabrication of polymer electrolyte membrane 16. Free standing cathodes 18 can be readily formed having suitable thicknesses of about 25 to about 500 micrometers.

Figure 5:
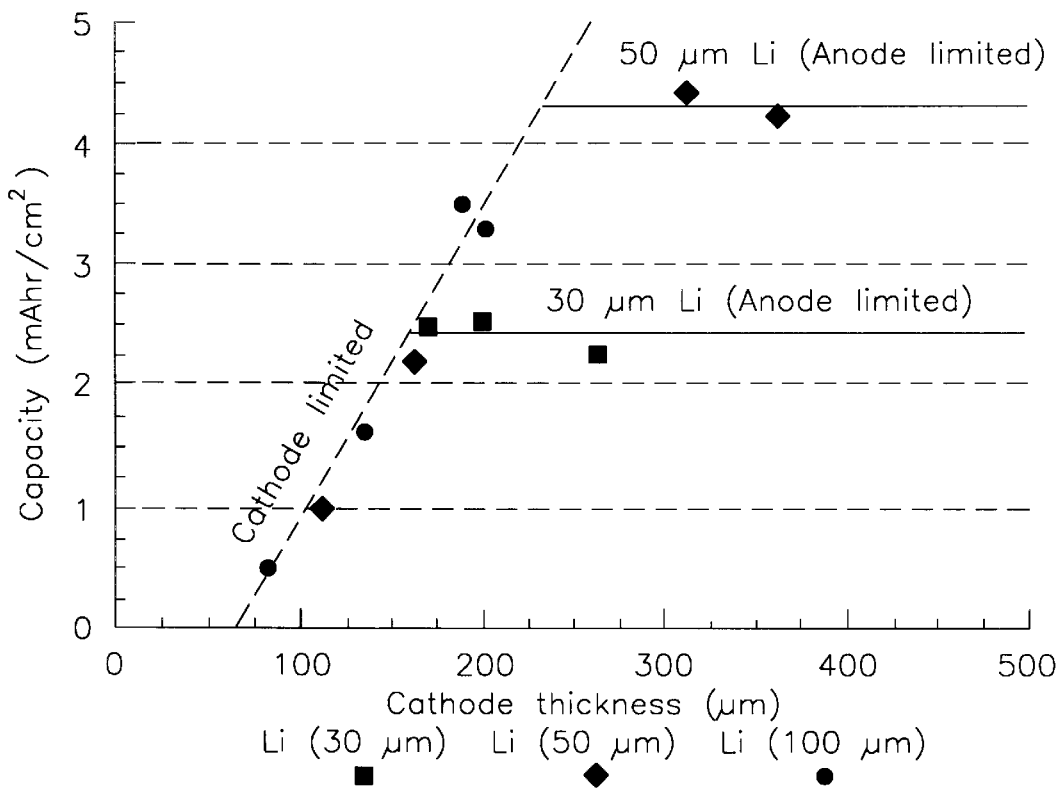
FIG. 5 shows cell capacity as a function of cathode thickness for three different thicknesses of the lithium foil anode.

The method of maximizing the energy density of primary battery 10 consists of determining the optimum thickness of the cathode for a given thickness of lithium foil anode. FIG. 5 shows a plot of battery capacity as a function of cathode foil thickness for three different foil thickness of 30 $\mu$m, 50 $\mu$m and 100 $\mu$m. The battery capacity (mAhr/cm$^2$) is determined from dc discharge curves of the type shown in FIG. 3 which shows the cell voltage as a function of time at a dc discharge current of 25 $\mu$A/cm$^2$. The battery capacity corresponded to a cut off voltage of 2 volts and is found by multiplying the time in hours at which the battery voltage dropped to 2.0 volts by the discharge current density (here in $\mu$A/cm$^2$).

As shown in FIG. 5, the battery capacity as a function of cathode thickness can be characterized by two distinct regions. One region is cathode limited, where the battery capacity increases linearly with the cathode thickness. The second region is anode limited, where the battery capacity is independent of the cathode thickness. In this region, the battery capacity is solely determined by the anode thickness. For a given Li foil thickness, the point of deviation from the linear behavior represents the optimum cathode thickness. An increase in cathode thickness beyond this value does not lead to any further increase in battery capacity. In similar fashion, this type of curve can be constructed for other batteries having different materials and/or component thicknesses.

Assembly of battery 10 with the above described components is generally as follows. The fabrication process essentially entails sequentially stacking the active layers of the cell, i.e., MnO$_2$ cathode 18, polymeric electrolyte membrane 16 and lithium anode 14, and placing the stack between metallic current collectors 12a and 12b to form a sandwich structure. The sandwich structure is then encapsulated in a lamiate pouch, formed by sheets 52a and 52b, which is heat sealed on all sides.

A detailed description of the fabrication procedure is as follows. Current collector foils 12a and 12b are first prepped by cleaning with IPA and sanding to remove surface oxides, then cut to the desired shape and size. One current collector is placed on a suitable surface and held in place by tab 28a. $MnO_2$ cathode 18, cut from a premade film to match the size of the first current collector, is placed on top of the current collector. Electrolyte membrane 16, also cut from a premade film, is placed on top of cathode 18. The electrolyte film is made slightly larger than cathode 18 in order to provide overlap on all edges. Lithium foil anode 14 is then cut to the size of cathode 18 and placed on top of electrolyte membrane 16. Second current collector 12b is placed on top of lithium anode 14 to complete the sandwich structure. The sandwich structure is then placed in a laminate pouch and sealed along the edges, leaving ample room for final sealing. Everything to this point is performed in an argon glove box. The cells are then transferred outside the glove box for final sealing, which consists of an evacuation step and trimming. The cells are vacuum packed by puncturing the top laminate layer at the edge with a vacuum pencil, evacuating and then resealing the cell close to the perimeter of the sandwich structure. The excess laminate sheeting 52a, 52b is then trimmed.

Figure 6:
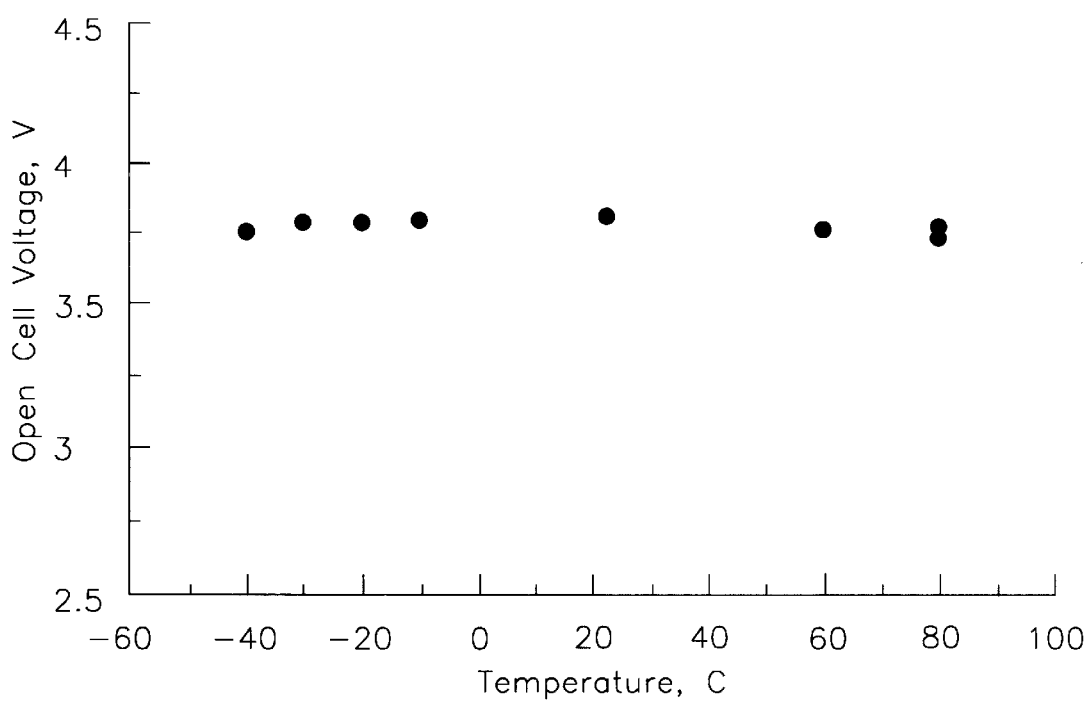
FIG. 6 shows the effect of temperature on the open circuit voltage.
Figure 7:
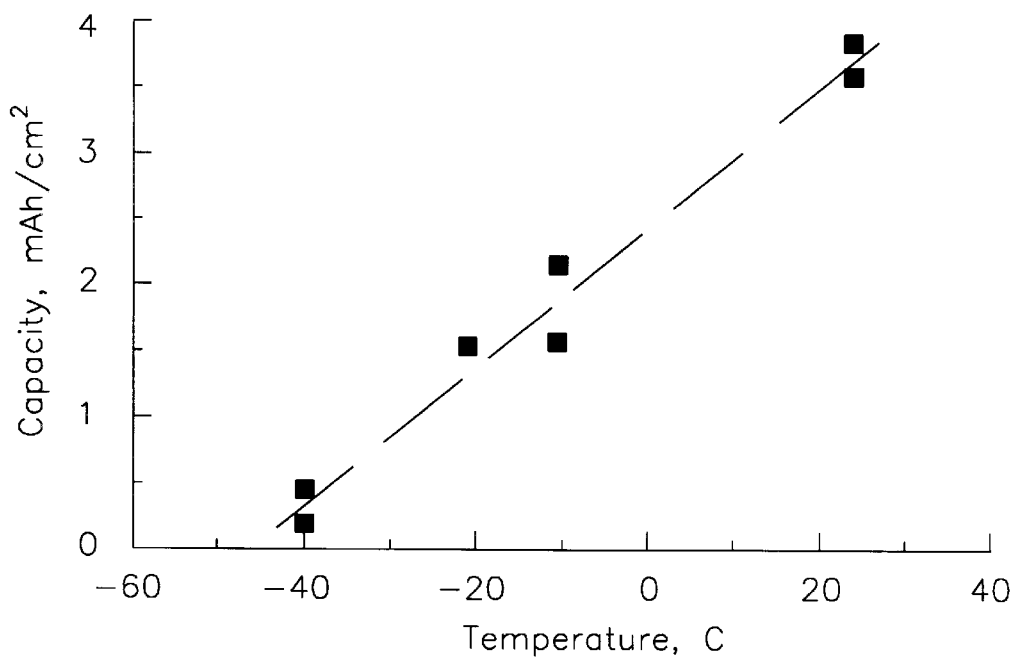
FIG. 7 shows the effect of temperature on cell capacity.
Figure 8:
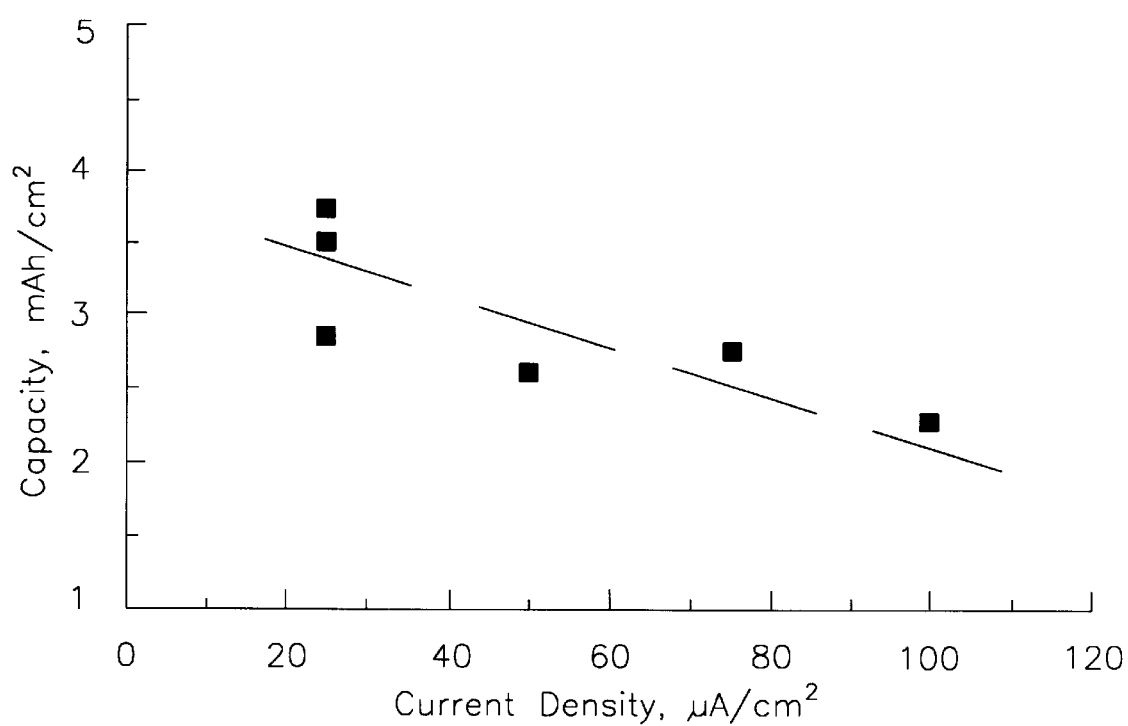
FIG. 8 shows the effect of discharge current density on cell capacity.
Figure 9:
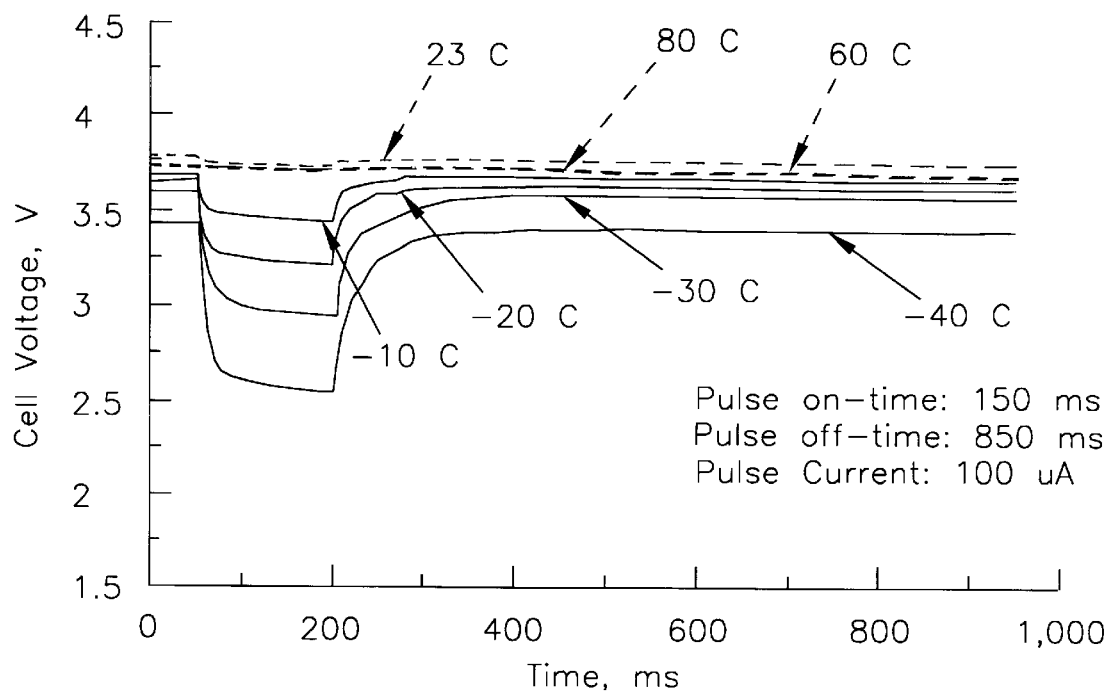
FIG. 9 shows the effect of temperature on battery performance under pulsed discharge current conditions.
Figure 10:
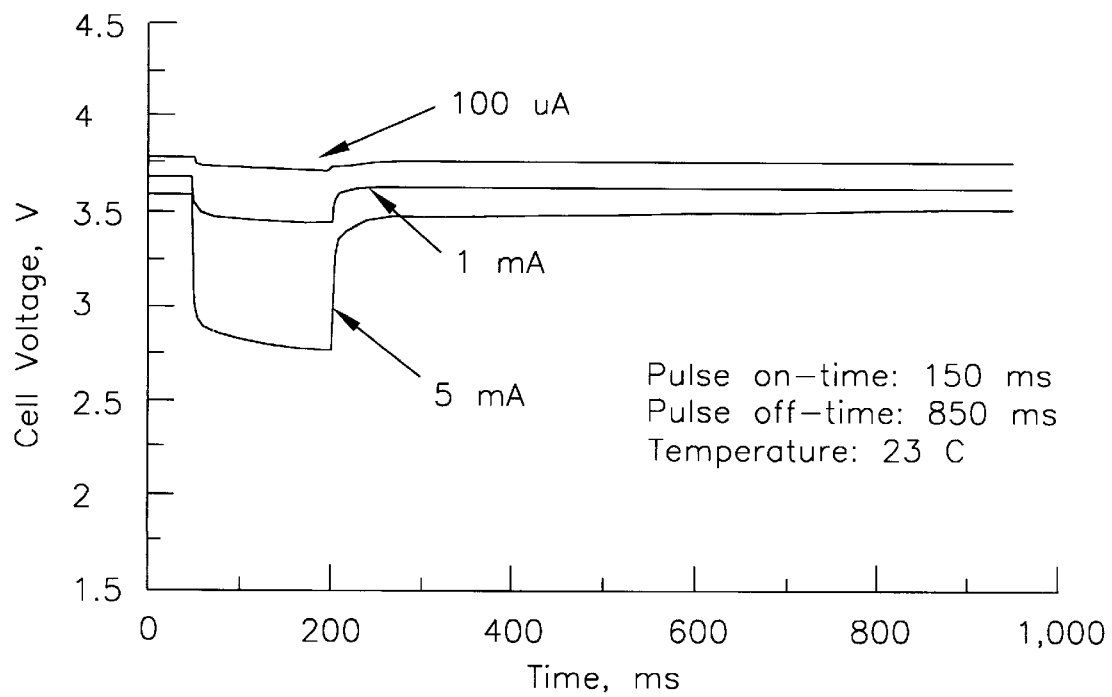
FIG. 10 shows the effect of pulse current on cell voltage.

FIGS. 6 through 8 show the performance of battery 10 of this invention at direct current discharge at different ambient conditions. Specifically, this battery measured 1 cm×1 cm and had 302 stainless steel current collectors. FIG. 6 shows that the open circuit voltage is little influenced by the temperature ranging between −40 and +80° C. FIG. 7 shows that the cell capacity decreases with decreasing temperature. Similarly, the cell capacity also decreases with an increase in discharge current as shown in FIG. 8. Data shown in FIGS. 9 and 10 were obtained from pulsed current experiments performed to demonstrate the wide applicability of the disclosed battery of this invention for RFIF tag application. The current pulse parameters are shown on FIGS. 9 and 10. FIGS. 9 and 10 show that the battery constructed with optimum materials can perform over a wide range of temperatures between −40 and 80° C. and up to a current range of 5 mA for a cell size of 1 cm×2 cm.

In operation, battery 10 is ideally suited for use in SSPDs such as radio frequency identification tags, PCMCIA cards, and smart cards. If the battery is fabricated by using optimal electrolyte membrane, cathode and current collector materials is able to perform suitably at temperatures down to about −40° C., characterized by the ability to deliver at least about 100 $\mu A$ for a pulse on-time of about 150 milliseconds and a pulse period of about one second, while sustaining a minimum voltage of greater than 2.5 volts, all this for a battery measuring 1 cm×2 cm. Furthermore, the battery is able to deliver at least about 5 mA for a pulse on time of about 150 ms and a pulse period of about one second at room temperature.

From the above, it can be seen that this invention is uniquely capable of performing well in SSPD applications, since battery 10 provides for a rugged flexible construction yet employs a solid polymer electrolyte membrane 16 that has electrical and power generating properties similar to liquid electrolyte batteries. The solid construction of the battery 10 is particularly necessary for use in self-contained applications that, by the nature of their use, expose the battery 10 to hostile environmental conditions. Furthermore, the battery 10 of this invention enables a wide range of uses in SSPD and similar applications due to its enhanced performance at sub-ambient temperatures. In particular, use of polyacrylonitrile as the polymer matrix for the electrolyte membrane 16 enables the battery 10 to exhibit conductivity at ambient temperatures on the order of liquid electrolytes employed with conventional primary batteries, and further enables the battery 10 to function at temperatures that are lower than was possible before by optimizing the ratio of the aprotic organic solvents within the electrolyte membrane 16.

In addition to the above, the exposure hazard of the lithium intercalation compounds within the cathode 18 is eliminated by the manner in which the cathode 18 is encapsulated within a polymeric matrix that is preferably composed of the same material as the electrolyte membrane 16. Therefore, the disclosed battery is significantly safer than both liquid electrolyte batteries and prior art solid electrolyte batteries.

While this invention has been described in terms of preferred embodiments, it should be apparent to one skilled in the art that other forms could be adopted. For example, other materials could be used or developed as substitutes for those noted, and different assembly techniques and procedures could be employed. As but one example, it is noted that 302 stainless steel was selected for use as the material for the current collectors. This suggests that other stainless steels may also be utilized with like or yet improved effect. Similarly, other materials (e.g., sputtered nickel) are suitable for use as the current collectors provided suitable sealable packaging materials are also used. Accordingly, the scope of our invention is to be limited only by the following claims.

What is claimed is:

1. A method for maximizing the energy density of a primary lithium battery having a first flexible current collector of a metal, a lithium anode contacting the first flexible current collector, a flexible polymer electrolyte membrane contacting the lithium anode, the polymer electrolyte membrane comprising an electrolyte contained within a polymeric binder, the electrolyte comprising a lithium salt and an organic aprotic solvent solution, the organic aprotic solvent solution comprising ethylene carbonate, propylene carbonate and gamma-butyrolactone in a molar ratio of about 1:0.8:0.67, the battery further having a flexible cathode contacting the flexible polymer electrolyte membrane, the cathode comprising a powder of lithium intercalation compound dispersed in an encapsulating matrix, and a second flexible current collector of a metal contacting the flexible cathode, said method comprising the steps of:

selecting a battery capacity and thickness of said lithium anode according to a graph of battery capacity versus cathode thickness for a plurality of different thicknesses of said lithium anode; and determining the cathode thickness by determining the point at which battery capacity changes from cathode limited to anode limited.

2. A method as recited in claim 1 wherein the polymeric binder is polyacrylonitrile.

3. A method as recited in claim 1 wherein the flexible cathode comprises a powder of manganese dioxide dispersed in the encapsulating matrix.

4. A method as recited in claim 3 wherein the flexible cathode comprises about fifty to about seventy weight percent manganese dioxide, about twenty-five to about fifty weight percent of the encapsulating matrix, and up to about five weight percent carbon.

5. A method as recited in claim 1 wherein the molar ratio of ethylene carbonate to propylene carbonate to gamma-butyrolactone in the flexible cathode is about 1:2:1.

6. A method as recited in claim 1 wherein the battery is characterized by a cell voltage of at least about 2.5 volts when discharged with a current pulse of about 100 $\mu$A/cm$^2$, a pulse on-time of about 150 milliseconds and a pulse period of about one second while at a temperature of about −40° C.

7. A method as recited in claim 1 wherein the metal of said current collectors is stainless steel.

8. A method as recited in claim 1 wherein the metal of said current collectors is sputtered nickel.

9. A method as recited in claim 7 wherein said stainless steel is 302 stainless steel.

10. A method as in claim 1 wherein the flexible cathode comprises about fifty-eight to about fifty-nine weight percent manganese dioxide, about forty weight percent encapsulating matrix, and about one to two weight percent carbon.

11. A method as in claim 10 wherein the flexible cathode comprises about fifty-eight weight percent manganese dioxide, about forty weight percent encapsulating matrix and about two weight percent carbon.

12. A method as in claim 1 further including first and second outer encapsulating layers, said first and second outer encapsulating layers being sealed to each other to thereby enclose said current collectors, said anode, said electrolyte membrane and said cathode.

13. A method for maximizing the energy density of a primary lithium battery having a first flexible current collector of a metal, a lithium anode contacting the first flexible current collector, a flexible polymer electrolyte membrane contacting the lithium anode, the polymer electrolyte membrane comprising an electrolyte contained within a polymeric binder, the electrolyte comprising a lithium salt and an organic aprotic solvent solution, the organic aprotic solvent solution comprising ethylene carbonate, propylene carbonate and gamma-butyrolactone in a molar ratio of about 1:0.8:0.67, the battery further having a flexible cathode contacting the flexible polymer electrolyte membrane, the cathode comprising a powder of lithium intercalation compound dispersed in an encapsulating matrix, and a second flexible current collector of a metal contacting the flexible polymeric composite cathode, said method comprising the steps of:

developing a graph of battery capacity versus cathode thickness for a plurality of different thicknesses of said lithium foil anode;

selecting a battery capacity and thickness of said lithium anode according to said graph; and determining the cathode thickness by determining the point at which battery capacity changes from cathode limited to anode limited.

14. A method as recited in claim 13 wherein the polymeric binder is polyacrylonitrile.

15. A method as recited in claim 13 wherein the flexible cathode comprises a powder of manganese dioxide dispersed in the encapsulating matrix.

16. A method as recited in claim 15 wherein the flexible cathode comprises about fifty to about seventy weight percent manganese dioxide, about twenty-five to about fifty weight percent of the encapsulating matrix, and up to about five weight percent carbon.

17. A method as recited in claim 13 wherein the molar ratio of ethylene carbonate to propylene carbonate to gamma-butyrolactone in the flexible cathode is about 1:2:1.

18. A method as recited in claim 13 wherein the battery is characterized by a cell voltage of at least about 2.5 volts when discharged with a current pulse of about 100 $\mu$A/cm$^2$, a pulse on-time of about 150 milliseconds and a pulse period of about one second while at a temperature of about −40° C.

19. A method as recited in claim 13 wherein the metal of said current collectors is stainless steel.

20. A method as recited in claim 13 wherein the metal of said current collectors is sputtered nickel.

21. A method as recited in claim 19 wherein said stainless steel is 302 stainless steel.

22. A method as in claim 13 wherein the flexible cathode comprises about fifty-eight to about fifty-nine weight percent manganese dioxide, about forty weight percent encapsulating matrix, and about one to two weight percent carbon.

23. A method as in claim 22 wherein the flexible cathode comprises about fifty-eight weight percent manganese dioxide, about forty weight percent encapsulating matrix and about two weight percent carbon.

* * * * *